July 30, 1940.  A. LAVORI  2,209,779
THERAPEUTIC APPARATUS
Filed April 26, 1939

INVENTOR
Angelo Lavori

Patented July 30, 1940

2,209,779

UNITED STATES PATENT OFFICE 2,209,779

THERAPEUTIC APPARATUS

Angelo Lavori, Stapleton, Staten Island, N. Y.

Application April 26, 1939, Serial No. 270,068

1 Claim. (Cl. 128—57)

The objects of this invention are to provide an improved machine of this type which will be simple in construction: to provide a massaging machine having motor driven appliances which are actuated at a reduced speed from the motor whereby the applicator will have proper timing to produce the best results; to provide a massaging machine having brackets which are driven to give a rotary movement to round or oval balls which rotate horizontally around parts of the body to be massaged, the abdomen, lower spine and sides in particular; and to provide such other improvements and details of construction as will be hereinafter described.

Figure 1:
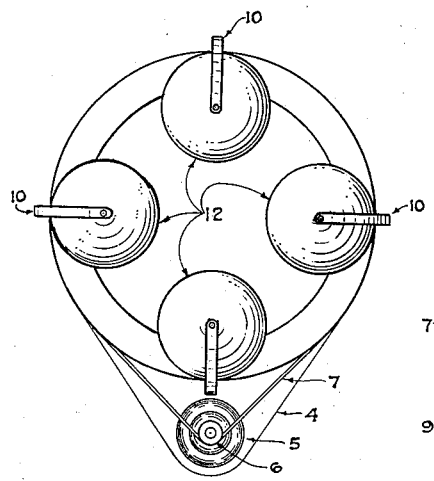
Figure 4:
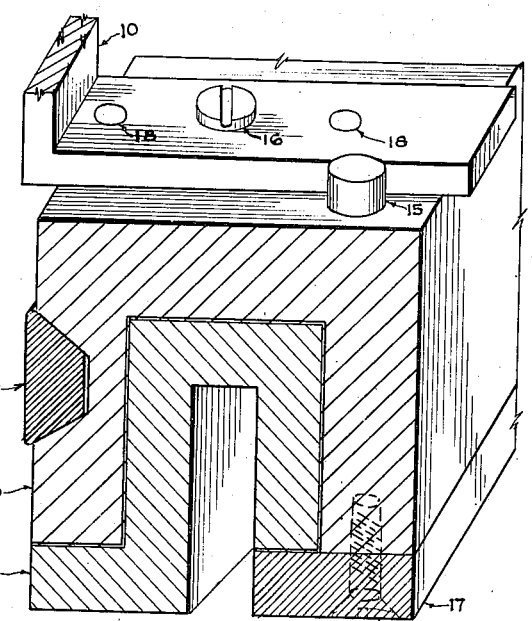
Figures 2, 3:
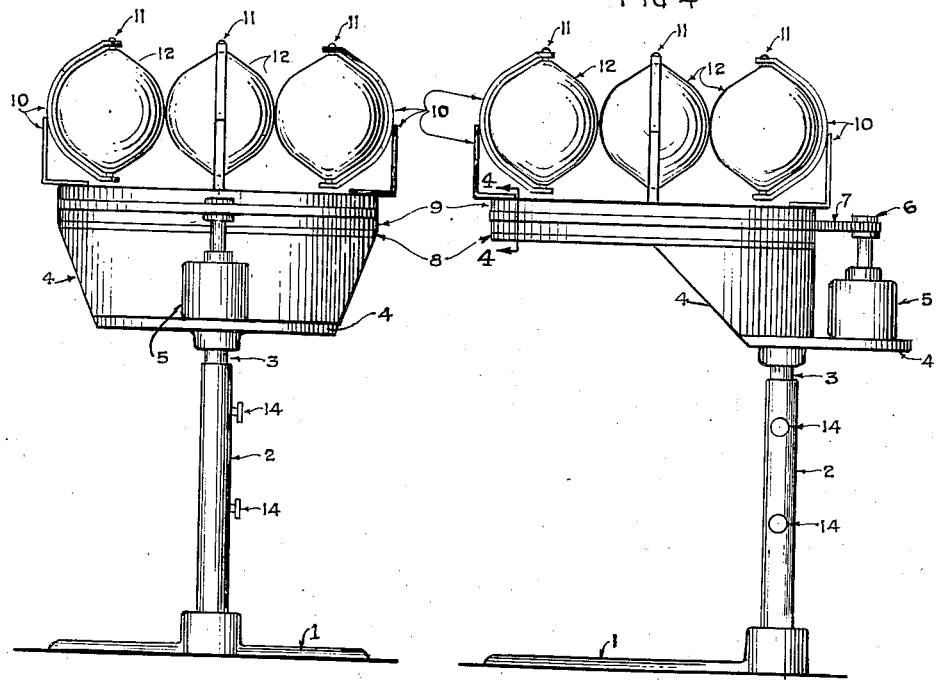

In the accompanying drawing illustrating a preferred commercial form of my invention, Figure 1 is a top view; Figure 2 is a rear elevation; Figure 3 is a side elevation; Figure 4 is a cross section showing male and female bearings, driving belt and bolt holes for adjustable brackets.

In the machine as shown in this drawing, I provide a platform 1, upon which the person to be treated stands. This platform has a telescopic post or column 2 and 3, which is secured thereto and extends upwardly a convenient distance to support operating mechanism. Set screws 14 are for adjusting telescopic columns to needed heights. A frame or block 4 is secured to the upper end of the column, the male bearing 8 and motor 5 are secured to the frame. Shown in Figure 4, is a cross section showing a male annular bearing 8, which is secured to frame 4. A female annular bearing 9, which rotates around the male annular bearing 8. A V-belt 7, which drives the female annular bearing 9. Adjustable bracket 10, secured by pivot set screw 16, onto female annular bearing 9. Holes 18, for adjusting bracket 10, towards or away from center of machine. A stop pin 15, secured on female annular bearing 9, to stop bracket 10, from moving away from the center of rotation. An annular ring 17, secured to female annular bearing by means of screws 19; the purpose of this ring 17, is to stop the female annular bearing 9, from lifting. The female bearing 9 is driven by a belt 7, which is motivated by pulley 6, and motor 5. The adjustable brackets 10, are secured to female annular bearing 9, by set screw pivot 16, to allow person to enter machine; bracket 10, is turned away from pin 15, thus moving the balls away from center of rotation. Before the person puts machine in operation, bracket 10 is turned until it contacts pin 15, due to the centrifugal force of the female annular bearing 9, being opposite that of the bracket 10, pin 15, will stop the bracket 10, at the center of rotation. Holes 18, on bracket 10, are to adjust bracket 10, away or towards the center of machine. The massaging balls 12 are supported by and rotate on pins 11, which are secured to the brackets 10.

It will be noted that the motive power might be obtained by securing a gear around the inside circumference of the female bearing and placing the motor inside the frame. It may also be noted that the operating portions of the machine might be secured to a wall or other support instead of being arranged on a pedestal. Other changes may suggest themselves as coming within the scope of this invention, which is set forth in the following claim, in which I claim:

In a massaging machine the combination of a revolving annular female bearing, supporting a series of applicator balls with a male annular bearing in which said female annular bearing lies, a frame supporting the male annular bearing without substantially obstructing the aperture formed by annular bearing, one or more columns of adjustable height supporting the frame, said column or columns attached to a base on which person under treatment stands.

ANGELO LAVORI.